United States Patent [19]

Asimopoulos et al.

[11] Patent Number: 5,703,971
[45] Date of Patent: Dec. 30, 1997

[54] PROCESS AND DEVICE FOR ANALYZING AND RESTORING IMAGE DATA IN A DIGITAL SIGNAL FROM A SCANNED DOCUMENT

[76] Inventors: Nikos Asimopoulos, 201 Cherokee Dr.; Alexander Michael Barry, 205D Tee St.; Morton Nadler, 414 Stonegate Dr., all of Blacksburg, Va. 24060

[21] Appl. No.: 393,257

[22] Filed: Feb. 23, 1995

Related U.S. Application Data

[63] Continuation of Ser. No. 41,812, Apr. 1, 1993, abandoned.
[51] Int. Cl.$^6$ .................................................. G06K 9/20
[52] U.S. Cl. .......................... 382/282; 382/270; 382/273; 382/312; 358/465; 358/474; 348/107; 348/112
[58] Field of Search ......................... 382/270, 275, 382/199, 201, 174, 282, 312, 273; 358/455, 456, 464, 467, 465, 474; 364/570, 575; 348/107, 112

[56] References Cited

U.S. PATENT DOCUMENTS

| | | | |
|---|---|---|---|
| 4,525,747 | 6/1985 | Sakai et al. | 382/53 |
| 4,710,822 | 12/1987 | Matsunawa | 382/53 |
| 4,774,569 | 9/1988 | Morton et al. | 382/282 |
| 4,855,943 | 8/1989 | Lewis | 382/275 |
| 4,868,670 | 9/1989 | Morton et al. | 382/275 |
| 4,972,501 | 11/1990 | Horyu | 382/53 |
| 5,086,486 | 2/1992 | Yamada | 382/53 |

*Primary Examiner*—Jose L. Couso
*Assistant Examiner*—Anh Hong Do
*Attorney, Agent, or Firm*—Bucknam and Archer

[57] ABSTRACT

A process and device for analyzing image data and performing automatic optimization of a black and white image created by a scanner. The process and device performs dynamic thresholding by approximating the information level and the background level at every pixel in the image, the threshold being calculated as a function of the background and information levels at that point, and a characterization process step comparing the pixel intensity at that point with the threshold, so that if the pixel is darker, it is considered to be black, or if it is lighter, it is considered to be white.

14 Claims, 4 Drawing Sheets

PROCESS AND DEVICE FOR ANALYZING AND RESTORING IMAGE DATA IN A DIGITAL SIGNAL FROM A SCANNED DOCUMENT

This is a Continuation Application of application Ser. No. 041,812, filed Apr. 1, 1993, for PROCESS AND DEVICE FOR ANALYZING IMAGE DATA, now abandoned.

The present invention relates to a process and a device assembly for analyzing image data performing automatic optimization of a black and white image created by a scanner. Typical use of an automatic optimizer according to the invention is in a document scanning, storage and retrieval system that needs to scan poor quality documents with little information loss and with little operator interaction. It is especially useful for automatic batch scanning, where a large set of documents need to be scanned without requiring the system operator to change contrast and brightness settings between documents in the batch.

A main object of the present invention is to propose a characterization process which produces a thresholded black and white output that is superior to the black and white image created by the scanner itself.

While known dynamic thresholding processes used in devices of this nature are one dimensional and can only set the threshold on a line by line basis, the characterization process of the invention is based on a pluri-dimensional, generally in practice two-dimensional, localized history sensitive dynamic thresholding process that converts grayscale intensity into monochrome black and white data.

Among the capabilities of the thresholding algorithm involved thereby are the ability to adjust to low contrast documents of varying background and foregrounds levels, the ability to adjust to different background levels on the same page, and the ability to perform the thresholding operation without rescanning and without large frame buffers. Because it performs an automatic dynamic threshold, it can eliminate the need for skilled operators, who would normally have to set brightness sensitivity and other parameters in order to properly operate the scanner.

Since the process of the invention is typically two dimensional, proceeding say both in vertical and horizontal directions, it can adapt locally to changes in image features encountered in either direction. Comparatively, prior thresholding devices can process images with horizontal stripes with threshold levels different from the regions above or below it, but cannot process vertical stripes that require thresholds different from the regions to the left or right of the vertical stripes. Also because the automatic optimizer implementing the invention uses a local dynamic threshold, it can properly process documents that require different threshold levels at different subregions of the image. Prior dynamic threeholding processes set not more than a global threshold on each individual line and cannot properly handle images that require multiple threshold levels.

Basically, the process according to the invention for analyzing image data such as issued from an image scanner performs dynamic thresholding by approximating the information level and the background level at every pixel in the image, the threshold being calculated as a function of the background and information levels at that point, and it comprises a characterization process step comparing the pixel intensity at that point with the threshold, so that if the pixel is darker, it is considered to be black, and/or if it is lighter, then it is considered to be white.

In a specific embodiment of the invention, a process for characterizing a signal indicative of intensity values of distributed discrete pixels of a scanned image, wherein each successively scanned pixel is evaluated as being black or white depending on a comparison between the intensity value of the scanned pixel and a calculated threshold assigned to said pixel, comprising for each said pixel, calculating said threshold as a function of a background level and an information level at that pixel, said background level being a first decayed level from a calculated whitest of background levels close to the current pixel in predetermined directions around it and said information level being a second decayed level from a calculated darkest of information levels close to the current pixel in predetermined directions around it, said first background decayed level and said second information decayed level being stored for use in the calculation of following thresholds for further pixels.

In practice, the predetermined directions around the current pixel are preferably two in number, and preferably in orthogonal positions along a vertical and a horizontal directons. The levels used for calculating whitest and darkest values can then be typically those of two pixels immediately next to the current pixel, which will thereafter be considered as being situated the one above the current pixel and the other to the left of said current pixel. The so-called black or white character of said pixel is assigned to it depending on the comparison between the intensity value of said pixel and the calculated threshold for it.

Decay rates used in decaying functions for the background and information levels are preferably set to suitable given fractions of 1 lower than 1. Appropriate decay rates have been determined at $\frac{1}{16}$ for background levels and $\frac{1}{32}$ for information levels in a specific embodiment of the invention.

In a preferred process according the invention, said process further comprises for each line of pixels: calculating an automatic guard band value as a function of the brightest and darkest level pixels both in the whole image and in the current line; comparing said automatic guard band to a normal guard band value entered by a user; disenabling the decaying function of the whitest and darkest levels respectively of the background and information levels if the maximal value of said automatic guard band and said manual guard band is greater than the difference between the background and information levels in said predetermined directions, such as above the current pixel or to the left of this pixel.

The automatic guard band can preferably be set to a suitable given fraction less than one (typically $\frac{1}{4}$) of the difference between the brightest and darkest pixel levels on the current line, added to a suitable given fraction less than one (typically $\frac{1}{8}$) of the difference between the brightest and darkest pixel levels in the whole image processed so far.

Another object of the invention is to include in an automatic optimizer implementing a process for analyzing image data comprising characterizing each pixel as being black or white as above, an interface to another device for enhancing the information data, such as a scan optimizer especially a binarization device for determining image edges such as described in U.S. Pat. No. 4,509,195 (here incorporated by reference), which performs edge detection and further enhances the quality of the black and white image resulting from the analyzing process.

In addition to the characterization device, including the thresholding process, and to the edge detection board represented by the binarization device, the invention has another object which is to provide in the automatic optimizer a process to automatically control the sensitivity level of the scan optimizer and so help automate the operation of the scan optimizer board. Normally, proper control of the scan optimizer's sensitivity parameter requires a skilled operator. Since the setting of the sensitivity is based upon the information and background levels at a specific pixel, the sensitivity is also a dynamic parameter, and can adjust to areas of the document where a low sensitivity setting is required or where a high sensitivity setting is required, unlike the known scan optimizer which has a fixed global sensitivity setting.

The invention will now be explained further by means of the accompanying diagrams, refering to a preferred specific embodiment and admitting the image data to be analyzed are registered as a signal indicative of intensity values of distributed discrete pixels of an image scanned line by line downwards from left to right along each line.

Figure 1:
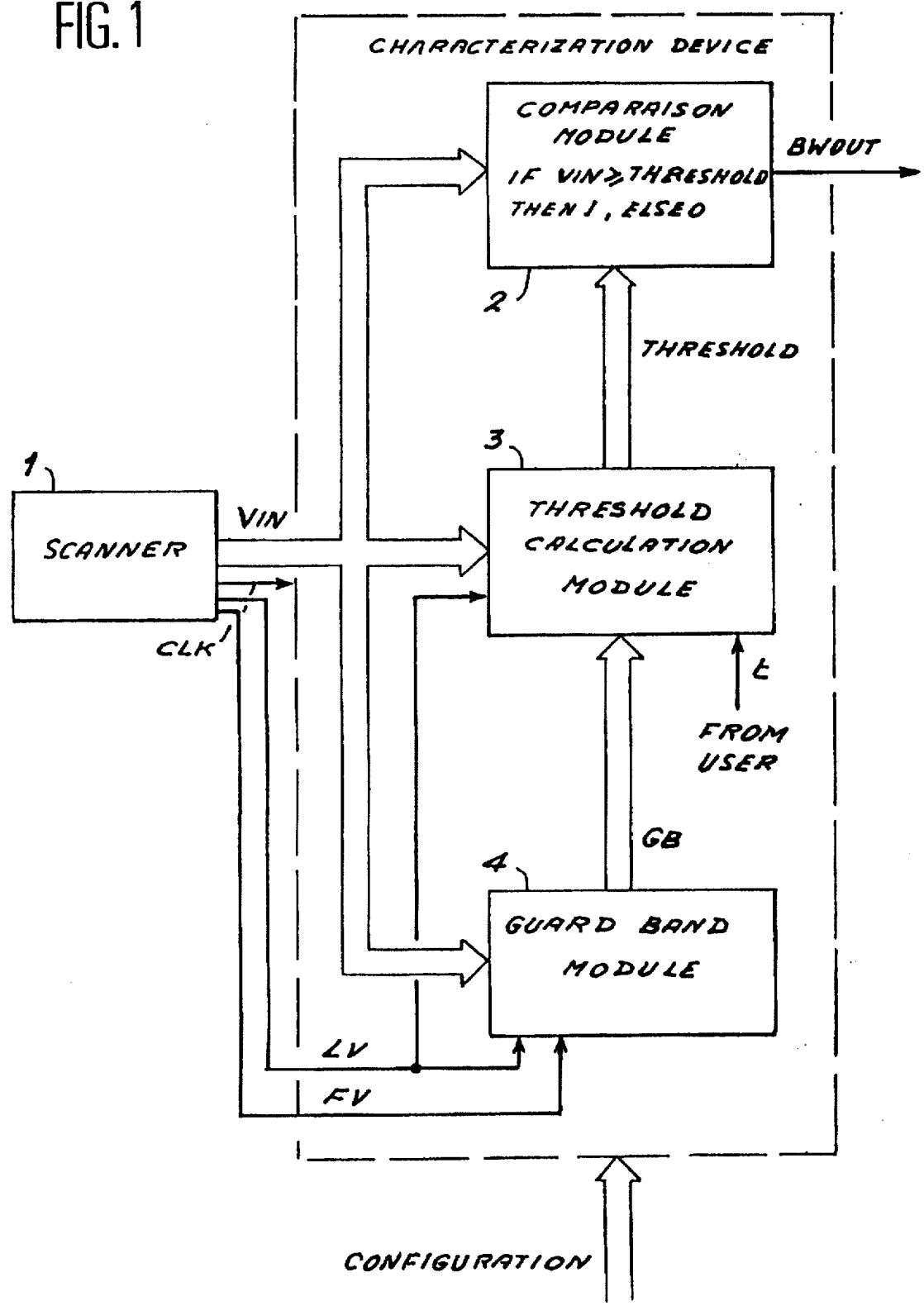
FIG. 1 is a block diagram representing the principal modules which the preferred embodiment of the invention comprises.

As shown in FIG. 1, the characterization device of the invention uses the intensity (VIN) at every pixel of the scanned image to issue for each pixel a black or white character (BWOUT). It is assumed that the scanned input (VIN) to the characterization device is obtained sequentially from a scanning head, where successive pixels are digitized (converted to digital values) with a number of bits compatible with the signal quality and its signal/noise ratio. On an eight-bit scanner 1, the intensity (VIN) of each pixel gives the graylevel of said pixel as a numerical value comprised in a grayscale from 0 for completely black to 255 for completely white, it being understood that in other embodiments black and white characters could be reversed.

In order to issue for each pixel of the scanned image a thresholded black or white data (BWOUT), the pixel intensity (VIN) of the current pixel is compared in a comparison module 2 to a calculated threshold (THRESHOLD) delivered by a threshold calculation module 3 by approximating an information level (INFO) and a background level (BACKGR) at every pixel of the image. If the pixel, namely the pixel intensity (VIN) is greater than or equal to the calculated threshold for that point, it is considered to be white. The output of the characterization device (BWOUT) which issues the black or white character of the pixel is a single-bit digital output taking respectively the value 0 or 1 (or reversibly).

Figure 2:
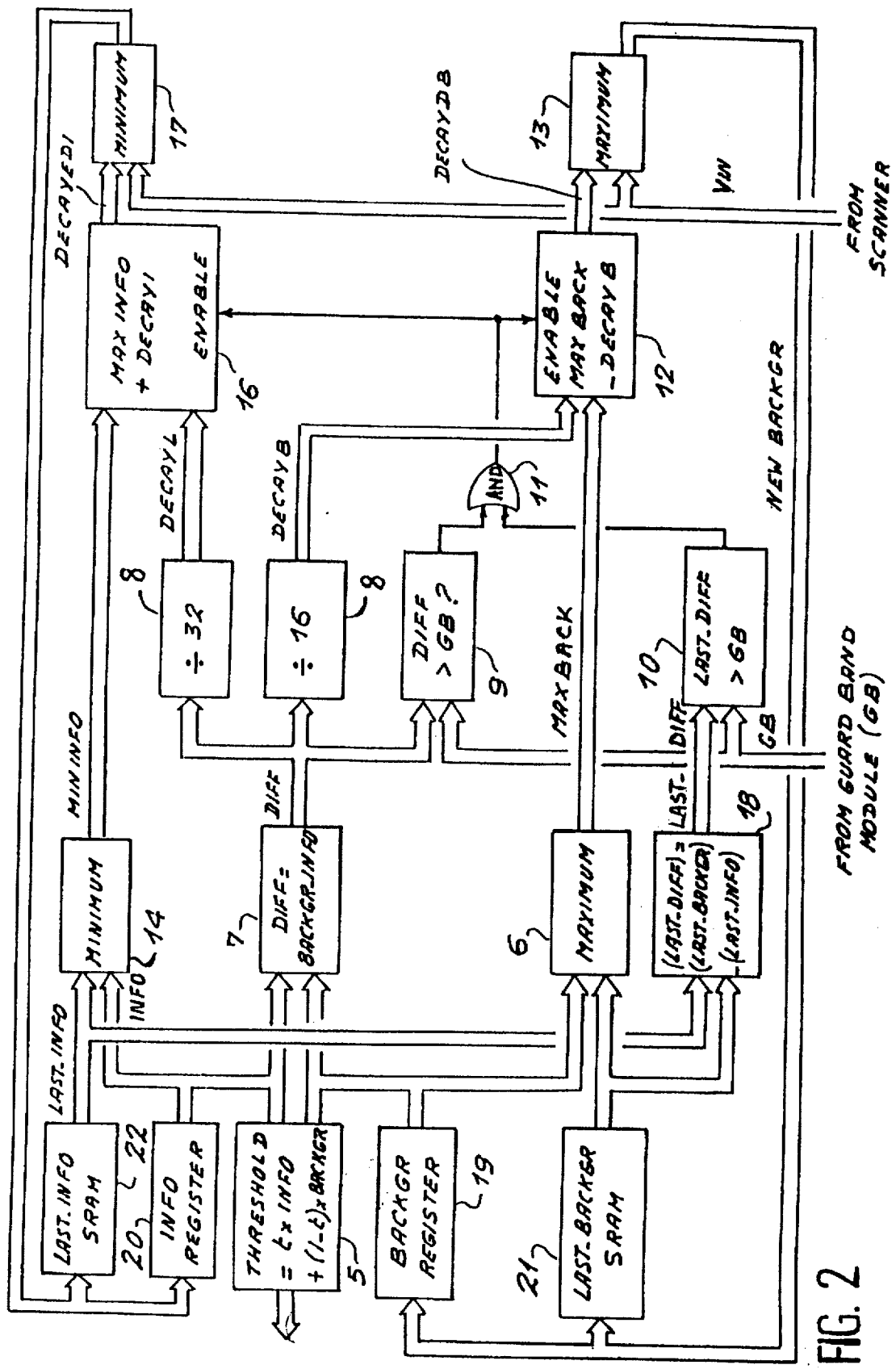
FIG. 2 is a detailed block diagram of the threshold calculation module shown in FIG. 1.

The threshold calculation module 3 as shown in FIG. 2 determines for each pixel a threshold (THRESHOLD) as a function of the background (BACKGR) and information (INFO) levels. This function can be formulated as:

THRESHOLD=*t*INFO+(1−*t*)*BACKGR where "t" is some fraction set in a configuration step by the user (for instance, ¼, ½ or ¾ in typical implementation).

Figure 3:
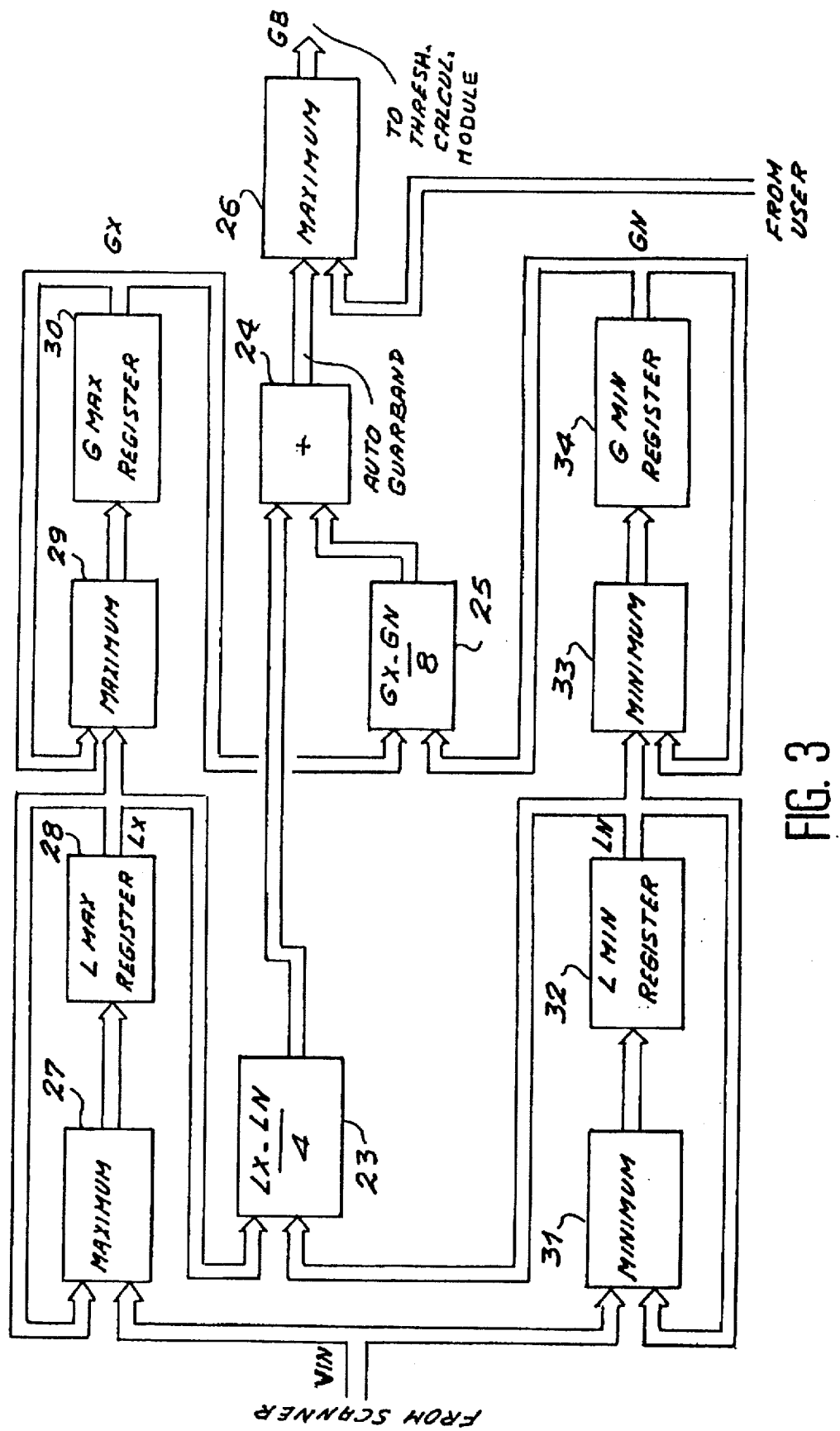
FIG. 3 is a detailed block diagram of the guard band module shown in FIG. 1.

The information (INFO) and background (BACKGR) levels at the current pixel, also called NEWINFO and NEWBACK, are calculated on the basis of the current pixel intensity VIN [x, y], the information and background levels above the current pixel, info [x, y−1] and backgr [x, y−1] also called LAST-INFO and LAST-BACKGR, the information and background levels to the left of the current pixel, info [x−1, y] and backgr [x−1, y] also called INFO and BACKGR, and a value called the guard band (GB) calculated by a guard band calculation module 4 (see FIG. 3, on a line by line basis and being a function of the brightest and darkest spots in the whole image and in the current line.

In a hardware device to implement this process, timing constraints require some modifications. Admitting the current pixel is called pixel [x, y], where x is the current pixel column and y is the current pixel row, the calculated threshold (THRESHOLD) to which the intensity (VIN) of the current pixel vin [x, y] is compared, namely threshold [x, y], is calculated on the basis of the background (BACKGR) and information (INFO) levels assigned to the pixel situated immediately to the left of the current pixel [x, y], namely backgr [x−1, y] and info [x−1, y]. The gray value at pixel [x−1,y] is delayed one cycle in a pipeline to compensate for this delay.

So as to compute the background level at the current pixel (NEWBACK), the maximum of the numeric value between the background level of the pixel situated immediately above the current pixel (LAST-BACKGR) and the background level to the left of the current pixel (BACKGR) is selected at 6 to give a value (MAXBACK) corresponding to the whiter of the two background levels. A decay rate (DECAYB) based upon the difference (DIFF) between the background and the information levels of the pixel situated immediately to the left of the current pixels (BACKGR and INFO) is calculated at 7, 8, and, under conditions fixed at 9, 10, 11 by the guard band (GB) (see hereafter), this decay rate is substracted at 12 from the MAXBACK value, resulting in a decayed background level (DECAYEDB).

In a preferred implementation, the decay rate (DECAYB) is equal to 1/16 of the difference (DIFF) between the background (BACKGR) and the information (INFO) levels.

The new background level (NEWBACK) is equal to the maximum determined at 13 of the numeric value between that decayed background level (DECAYEDB) and the intensity (VIN) of the current pixel. It is thereby equal to this decayed background level (DECAYEDB) unless the image intensity (VIN) at the current pixel is whiter than the decayed background, and in that latter case the new background level (NEWBACK) is set to the image intensity. This prevents the background level from decaying past its proper level.

To compute the information level at the current pixel (NEWINFO), the minimum of the numeric value between the information level above the current pixel (LAST-INFO) and the information level to the left of the current pixel (INFO) Ks selected at 14 to give a value (MININFO) corresponding to the blackest of the two information levels. A decay rate (DECAYI), also based upon the difference (DIFF) between the background and information levels to the left of the current pixels (BACKGR and INFO), is calculated at 7, 8 and, under the same conditions fixed at 9, 10, 11 by the guard band (GB) for the decayed background (DECAYEDB), is added at 16 to the MININFO value, resulting in a decayed information level (DECAYEDI).

In the preferred implementation, the decay rate (DECAYI) is equal to 1/32 of the difference (DIFF) between the background (BACKGR) and the information (INFO) levels.

The new information level (NEWINFO) is set at 17 equal to the minimum of the numeric value between that decayed information level (DECAYEDI) and the intensity (VIN) of the current pixel. Therefore, it is equal to this decayed information level (DECAYEDI) unless the image intensity (VIN) at the current pixel is blacker than the decayed information, and in that latter case the intensity value (VIN) is assigned to the new information level (NEWINFO).

As it can be seen in FIG. 2, a difference (called LAST-DIFF) between the information and the background levels above the current pixel (LAST-BACKGR and LAST-INFO) is also calculated at 18. This LAST-DIFF value as well as the DIFF value are compared to the guard band value issued from the guard band module 4 and, if both the differences between the background (BACKGR) and information (INFO) levels to the left of the current pixel or between the background (LAST-BACKGR) and the information (LAST-INFO) levels above the current pixel are greater than the guard band value (GB), the adder 16 and substracter 12, giving respectively the decayed background level (DECAYEDB) and the decayed information level (DECAYEDI) are enabled, so that the MAXBACK and MININFO values ere decayed. If not, the adder 16 and substracter 12 are disenabled, so that the decayed background level (DECAYEDB) and the decayed information level (DECAYEDI) are respectively assigned to the MAX-BACK and MININFO values.

In the preferred implemention the BACKGR and INFO values are respectively stored in a first register 19 and a second register 20, and the LAST-BACKGR and LAST-INFO values are respectively stored in a first 21 and second 22 RAM addressed by pixel column. All the values used or calculated in the threshold calculation module 3 of FIG. 2, excepting the enable/disenable signal of the adder 16 and substracter 12, the resulting values of comparators 9, 10 from the LAST-DIFF and DIFF values to the guard band (GB), are eight bit digitalized values in the range from 0 to 255.

At the beginning of a document or image, the background levels (BACKGR and LAST-BACKGR) are set to completely white (set to 255) and the foreground or information levels (INFO and LAST-INFO) are set to completely black (reset or set to 0).

The device called the guard band module 4 is used to prevent the information and background levels from converging upon each other, in large comparatively informationless areas of the image. As it was explained above, in case the difference between the information and background levels become less than the guard band, the levels no longer decay.

In the preferred implementation of the guard band shown in FIG. 3, an automatic guard band (AUTOGB) is set to ¼ of the difference between the brightest (LX) and the darkest (LN) pixel in the current line from 23, added at 24 to ⅛ of the difference between the brightest (GX) and the darkest (GN) pixel in the whole image processed so far, issuing from 25. This automatic guard band (AUTOGB) is compared at 26 with a manual guard band (MANUAGB) specified by the user, and the larger value is set as the guard band (GB) for use by the threshold calculation module 3.

The guard band calculation module 4 receives the intensity level (VIN) of each pixel. The intensity level (VIN) of the current pixel is compared at 27 with the maximal value (LX) of the preceeding intensity levels since the beginning of the current line extracted from a third register 28, and the largest value is stored in said third register 28 as the current maximal value (LX). This maximal value (LX) is compared at 29 with the maximal value (GX) of the precedent intensity levels since the beginning of the whole scanned image extracted from a fourth register 30 and the larger value is stored in said fourth register 30 as the current maximal value (GX).

The intensity level (VIN) of the current pixel is also compared at 31 with the minimal value (LN) of the preceding intensity levels since the beginning of the current line, extracted from a fifth register 32, and the lower value is stored in the said fifth register 32 as the current minimal value (LN). This minimal value (LN) is compared at 33 with the minimal value (GN) of the preceding intensity levels since the beginning of the whole scanned image extracted from a sixth register 34, and the lower value is stored in said sixth register 34 as the current minimal value (GX).

At the beginning of each line the third register 27 is reset (or set) to 0 and the fifth register 32 is set to 255. At the beginning of each image the fourth register 30 is reset (or set) to 0 and the sixth register 34 is set to 255.

Since the characterization device does not rescan or buffer, it proceeds line by line, typically starting exploring the upper left pixel of the image, scanning horizontally from it to the end pixel of the first line in the image, then starting again at the beginning left end of the second line upright the upper left pixel of the image. Each line is thus processed sequentially until the entire image is processed.

The decay rates for the information surface and the background surface are not symmetrical. The background decays have a rate approximately twice that of the information level. This causes a tendency to move the background level closer to the pixel intensity in large areas with little information, thus tending to make large areas background pixels instead of foreground information. The guard band device will usually keep large black features black, but when there is no other reasonable criteria to judge the large feature, white will be the preferred assignment.

Figure 4:
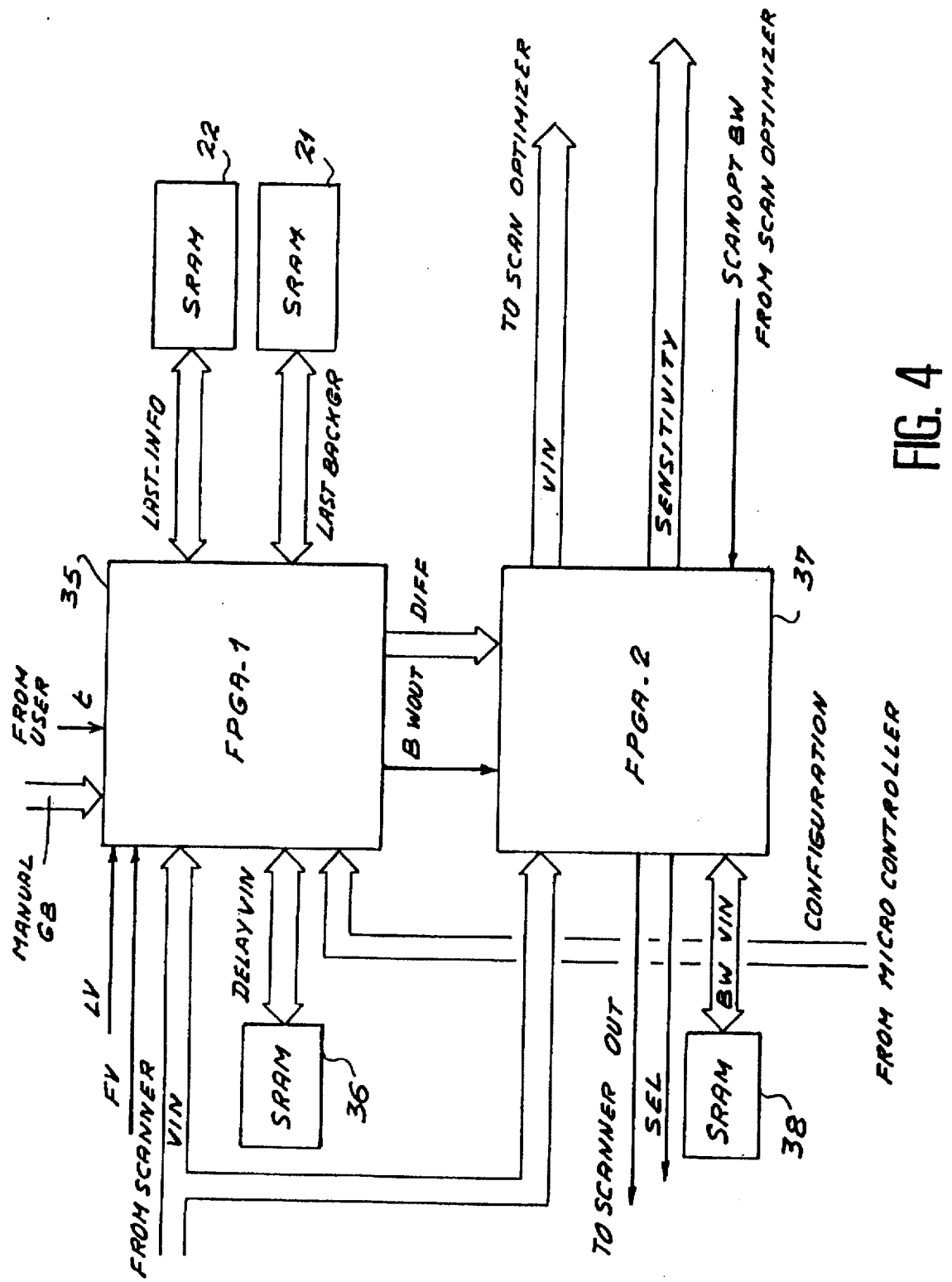
FIG.4 shows a preferred implementation of the invention as interface to a brand of scanner.

In the preferred implementation of the automatic optimizer of the invention as shown in FIG. 4, the characterization device is implemented on a printed circuit board using in a first Xilinx field programmable gate array (FPGA1) 35 (for example, a XC4005PG156-5 chip) associated to three static RAM (SRAM) chips 21, 22 and 36 used respectively to store the values of the background (LAST-BACKGR) and information (LAST-INFO) levels above the current pixel and to buffer one line of grayscale data.

The black and white output (BWOUT) of the characterization device and also the difference value (DIFF) between the background (BACKGR) and information (INFO) levels from the threshold in calculation module 3 delivered by the FPGA1 35 are sent to a second Xilinx field programmable gate array (FGPA 2) 37 (for example, a XC4003PC84-5 chip) which generates a five by five pixel window (BWWIN) using a fourth static ram (SRAM) chips 38 and internal flip-flops. It also filters the black and white data (BWOUT) and delays it to synchronize with an output (SCANOPTOUT) of another treatment device of the scanned image which it also reads. It combines these two outputs (BWOUT and SCANOPTOUT) and sends the resulting output (OUT) to a scanner interface card (not shown) to the scanner 1.

Another image data treatment device in the preferred embodiment herein described is a scan optimizer, also called a binarization device, such as described with further details in U.S. Pat. No. 4,509,195, which is incorporated in the present description by reference. In order to enhance detection and restitution of the edges in the image patterns, the binarization device uses the pixel intensity (VIN) and a sensitivity signal (SENSITIVITY) here calculated by a second field programmable gate array FPGA2 37 on the basis of the DIFF signal.

Automatic sensitivity control is performed by watching the DIFF variable, which represents the difference between the current background level (BACKGR) and the current information level (INFO). When the signal increases, either information or background have to be reset to the image intensity input. This corresponds to an edge in the image. When this occurs, the new sensitivity (SENSITIVITY) is set to NEWSENS=min (DIFF/4+OFFSET, MINSENS), where OFFSET and MINSENS are user-defined parameters. The SENSITIVITY is used to control the scan optimizer board.

The scanner interface card delivers to the represented implementation the pixel intensity (VIN) of each scanned pixel and delivers back to the scanner 1 the final output (OUT).

A scan optimizer interface delivers to the binarization device the intensity (VIN). The sensitivity (SENSITIVITY) calculated by FPGA2 37 and reads back the output bit (SCANOPTOUT) delivered by the binarization device.

Since the present automatic optimizer uses field programmable gate arrays (FPGAs) 35 and 37, the FPGAs must be configured whenever power is applied. This function is performed by a microcontroller card (not shown), which drives the configuration signal lines (CCLK, DIN, PROG, INIT, DONE) designated as CONFIGURATION to the two Xilinx chips 35 and 37.

The automatic optimizer so implemented also uses four counters to count the number of pixels from the beginning of the image line, and to drive the address lines on the SRAM schips.

Connectors (not shown) are also provided to interface to the scan optimizer, the scan optimizer microcontroller and the scanner interface card.

Once configured, the Xilinx chips 35 and 37 perform the thresholding operation upon data received from the scanner interface card, pass the data onto the scan optimizer, and filter and synchronize the black and white output data. The SRAM chips are used to store the values of the background and information levels, to buffer one line of grayscale data, and to filter the black and white data. The counters count the number of pixels from the beginning of the image line, and drive the address lines on the SRAM chips. After being processed by the auto optimizer and/or the scan optimizer, the black and white data is returned to the scanner through the interface card, where it is substituted for the scanner's output.

The interface card provides the following signals:

CLK: The pixel clock.
VIN[0-7]: Gray scale data. valid on the falling edge of CLK
LV: Active low line valid. A high pulse on this signal indicates the beginning of a new pixel line.
FV: Frame valid. Indicates the beginning of a new image.

In return, the automatic optimizer produces the following signals:

OUT: Black and white output data. Must be valid on the rising edge of CLK.
SEL: Multiplexer control line. A high signal indicates that the scanner's normal output should be selected. A low signal selects the auto optimizer's output.

These same signals are duplicated on the connection to the scan optimizer. In addition, the automatic optimizer generates the following signals to the scan optimizer:

SENS[0-7]: Sensitivity control. Sets the sensitivity level for the edge detection algorithm in the scan optimizer.

The clock cycle from the interface card may be subsampled to enable interfacing to scanners that generate data faster than the auto optimizer can normally handle. This clock cycle is divided into a read and a write half cycle. The counters and the addresses for the SRAMs change during the first half, and the SRAMs are put in read mode. Their outputs are latched in the Xilinxes at the end of the read cycle. During the second half of the clock period, the SRAMs are placed in write mode, and the Xilinxes drive their inputs. The SPAMs latch the data at the end of the write cycle and the beginning of the next read cycle.

The mapping of the algorithm to the hardware is fairly straightforward, and is illustrated in FIG. 4. First, the XC4005 (FPGA1) finds the maximum and minimum grayscale value on the current line, averages adjacent pixels if enabled, and writes the averaged line to an SRAM buffer (SRAM1). At the same time, it reads the grayscale written to SRAM1 on the previous line and performs the dynamic threshold (THRESHOLD) upon it. The storage of INFO (x-1,y) and BACKGR (x-1,y) is in internal registers 19, 20 but INFO (x,y-1), also called LAST-INFO, and BACKGR (x,y-1), also called LAST-BACKGR, are stored in the SRAM chips 21 and 22. The old values are read during the first half of the computation cycle, and written during the second half of the computation cycle. The thresholded black and white bit (BWOUT) and the difference between info and backgr (DIFF) are sent to the XC4003 (FPGA2).

Second gate array FPGA2 reads the black and white bit from first gate array FPGA1, and generates a five by five pixel window using SRAM4 and internal flip-flops. It filters the black and white data and delays it to synchronize with the scan optimizer output (SCANOPTBW), which it also reads. It combines the two outputs and sends the output (OUT) to the interface card.

At the same time, second gate array FPGA2 reads the DIFF signal generated by first gate array FPGA1, and calculates the sensitivity (SENSITIVITY) to control the scan optimizer.

While in the preferred embodiment and implementation described above the multibit digital values are considered as eight bit values, it should be clear here that the number of bits to which the automatic optimizing process can be applied depends generally on the number of bits delivered for each pixel by the scanner.

Besides, the preferred embodiment herein described takes into account only information and background data from pixels considered as being immediately to the left and immediately above the present pixel, so as to utilize them to set the new information and background values at the current pixel, as a function also of the current pixel's gray value. In other embodiments obvious to a person skilled in the art, use can be made in the same manner of further data from the complete vicinity of the current pixel, selected in predetermined directions in a window encompassing the current pixel.

What we claim is:

1. An image scanning device comprising:
 a) a scanning reading device for scanning a document and for providing a primary digital image data signal representative of pixel intensity values for each discrete pixel of said scanned document; and
 b) a binarizing device for binarizing said primary image data signal, including means for adjusting a threshold value to each pixel and means for comparing each of said pixel intensity values with the threshold value associated to the pixel and for delivering a binary image signal based on said comparison,
  said threshold adjusting means comprising means for assigning to each pixel a background parameter value and an information parameter value, wherein said assigning means comprises
  window memory means for memorizing said background and information parameter values assigned to at least one of the previously scanned pixels situated immediately adjacent to the current pixel,
  first decaying means for diminishing the stored background parameter value assigned to said one of said previously scanned pixels and providing the diminished result as a decayed background level and an associated first setting means for setting the background parameter of the current pixel at a value which is the highest one of the intensity value of the current pixel and said decayed background level, second decaying means for increasing the stored information parameter value assigned to said one of said previously scanned pixels and providing the increased result as decayed information level, and associated second setting means for setting the information parameter of the current pixel at a value which is the lowest one of the intensity value of the current pixel and said decayed information level, means for calculating the threshold value as a function of said set current background and information parameter values, and means for providing a guard band value, and means responding to the difference between the stored background and information parameter values of at least one of said previously scanned pixels for disabling said first and second decaying means whenever said difference is lower than said guard band value.

2. The image scanning device according to claim 1, wherein said means for providing a guard band value comprises means for setting said guard band value as a function of the difference between the highest and the lowest intensity values of the previously scanned pixels of the current line and/or of the whole image.

3. An image scanning device comprising:
a) a scanning reading device for scanning a document and for providing a primary digital image data signal representative of pixel intensity values for each discrete pixel of said scanned document; and
b) a binarizing device for binarizing said primary image data signal, including means for adjusting a threshold value to each pixel and means for comparing each of said pixel intensity values with the threshold value associated to the pixel and for delivering a binary image signal based on said comparison,
said threshold adjusting means comprising means for assigning to each pixel a background parameter value and an information parameter value, wherein said assigning means comprises
window memory means for memorizing said background and information parameter values assigned to at least one of the previously scanned pixels situated immediately adjacent to the current pixel,
first decaying means for diminishing the stored background parameter value assigned to said one of said previously scanned pixels and providing the diminished result as a decayed background level and an associated first setting means for setting the background parameter of the current pixel at a value which is the highest one of the intensity value of the current pixel and said decayed background level,
second decaying means for increasing the stored information parameter value assigned to said one of said previously scanned pixels and providing the increased result as decayed information level, and associated second setting means for setting the information parameter of the current pixel at a value which is the lowest one of the intensity value of the current pixel and said decayed information level,
means for calculating the threshold value as a function of said set current background and information parameter values; and c) a device for the binarized evaluation of a document comprising:
means for registering the intensity values of pixels distributed in at least two concentric rings around each elementary area of successively scanned elementary areas, at least in one sector centered on said elementary area, determining contrast values each equal to the difference of the registered intensity values between a pixel of an inner ring and a pixel of an outer ring, and assigning a positive and negative difference sign to respectively the positive and negative contrast values thus determined having an absolute value higher than a predetermined contrast threshold, wherein a contrast threshold value which is a function of the difference between the stored background and information parameter values of at least one of said previously scanned pixels is substituted for the predetermined contrast threshold; and
means for counting distinctively said positive and negative difference signs in the vicinity of said elementary area and means for assigning a light or dark quality to said elementary area respectively when said counted difference signs contain a predominant number of positive or negative difference signs conforming to a predetermined minimum condition.

4. An image scanning device comprising:
a) a scanning reading device for scanning a document and for providing a primary digital image data signal representative of pixel intensity values for each discrete pixel of said scanned document;
b) a binarizing device for binarizing said primary image data signal, including means for adjusting a threshold value to each pixel and means for comparing each of said pixel intensity values with the threshold value associated to the pixel and for delivering a binary image signal based on said comparison,
said threshold adjusting means comprising means for assigning to each pixel a background parameter value and an information parameter value, wherein said assigning means comprises
window memory means for memorizing said background and information parameter values assigned to at least one of the previously scanned pixels situated immediately adjacent to the current pixel,
first decaying means for diminishing the stored background parameter value assigned to said one of said previously scanned pixels and providing the diminished result as a decayed background level and an associated first setting means for setting the background parameter of the current pixel at a value which is the highest one of the intensity value of the current pixel and said decayed background level,
second decaying means for increasing the stored information parameter value assigned to said one of said previously scanned pixels and providing the increased result as decayed information level, and associated second setting means for setting the information parameter of the current pixel at a value which is the lowest one of the intensity value of the current pixel and said decayed information level,
means for calculating the threshold value as a function of said set current background and information parameter values,
means for providing a guard band value, and means responding to the difference between the stored background and information parameter values of at least one of said previously scanned pixels for disabling said first and second decaying means whenever said difference is lower than said guard band value; and c) a device for the binarized evaluation of a document comprising:

means for registering the intensity values of pixels distributed in at least two concentric rings around each elementary area of successively scanned elementary areas, at least in one sector centered on said elementary area, determining contrast values each equal to the difference of the registered intensity values between a pixel of an inner ring and a pixel of an outer ring, and assigning a positive and negative difference sign to respectively the positive and negative contrast values thus determined having an absolute value higher than a predetermined contrast threshold, wherein a contrast threshold value which is a function of the difference between the stored background and information parameter values of at least one of said previously scanned pixels is substituted for the predetermined contrast threshold; and means for counting distinctively said positive and negative difference signs in the vicinity of said elementary area and means for assigning a light or dark quality to said elementary area respectively when said counted difference signs contain a predominant number of positive or negative difference signs conforming to a predetermined minimum condition.

5. The image scanning device according to claim 4, wherein said means for providing a guard band value comprises means for setting said guard band value as a function of the difference between the highest and the lowest intensity values of the previously scanned pixels of the current line and/or of the whole image.

6. A process for providing a characterization binary output from a signal indicative of intensity values of distributed discrete pixels of a scanned image of a document emitted by a scanning device, wherein each of successively scanned pixels is characterized as being black or white depending on a comparison between the intensity value of the scanned pixel and a threshold assigned to said pixel, said process comprising successively assigning to each pixel a background level and an information level and calculating said threshold as a function of said background level and said information level at that pixel, wherein each of said assigning and calculating steps comprises the substeps of:

determining the whitest one of the background levels assigned to those of the previously scanned pixels which are situated immediately adjacent to the current pixel in predetermined directions around it and the darkest one of the information levels assigned to said previously scanned pixels, decaying said whitest background level by subtracting a first decay rate from this level and decaying said darkest information level by adding a second decay rate to this level, setting the background level of the current pixel at a value which is the highest one of the intensity value of the current pixel and said decayed background level, and setting the information level of this pixel at a value which is the lowest one of the intensity value of the current pixel and said decayed information level, and memorizing said set current background level and said set current information level for use in the calculation of following thresholds for further pixels.

7. A process according to claim 6, wherein said predetermined directions around the current pixel are two orthogonal respectively vertical and horizontal directions, and the background and information levels used in said determining substep are those of two pixels immediately next to the current pixel, situated the one above the current pixel and the other to the left of said current pixel.

8. A process according to claim 6 further comprising for every successive line of pixels:

calculating an automatic guard band value (AUTOGB) as a function of the brightest and darkest pixel levels both in the whole document and in the current line;

comparing said automatic guard band to a manual guard band value entered by a user;

using in said setting substep said whitest background level and said darkest information level determined in said determining substep instead of said decayed background level and said decayed information level whenever the maximal value of said automatic guard band and said manual guard band is greater than the difference between the background and information levels of the pixel situated above the current pixel or that of the pixel situated to the left of the current pixel.

9. A process according to claim 6 wherein the decay quantities applied in decaying the background and information levels are set to a given fraction of 1 less than one of the difference between the background and the information levels assigned to the pixel situated to the left of the current pixel.

10. A process according to claim 6 wherein the decay quantity applied in decaying the background level is set at a value twice that for the information levels.

11. A process according to claim 8 wherein the automatic guard band is set to a given fraction less than one of the difference between the brightest and darkest pixel levels (LX, LN) on the current line, added to a given fraction less than one of the difference between the brightest and darkest pixel levels (GX, GN) in the whole image processed so far.

12. A process according to claim 8 wherein the automatic guard band is set to a first given fraction less than one of the difference between the brightest and darkest pixel levels (LX, LN) on the current line, added to a second given fraction half the first one of the difference between the brightest and darkest pixel levels (GX, GN) in the whole image processed so far.

13. A process according to claim 12 wherein said first given fraction is ¼ and said second given fraction is ⅛.

14. A process according to claim 13 wherein the decay rate applied in decaying the background levels around each current pixel is set to 1/16, and the decay rate used in decaying information levels is set to 1/32.

* * * * *